(12) United States Patent
Wittgreffe

(10) Patent No.: US 8,503,315 B2
(45) Date of Patent: Aug. 6, 2013

(54) DATA NETWORK MONITORING SYSTEM AND METHOD FOR DETERMINING SERVICE QUALITY MEASURE

(75) Inventor: John P Wittgreffe, Suffolk (GB)

(73) Assignee: British Telecommunications public limited company, London (GB)

( * ) Notice: Subject to any disclaimer, the term of this patent is extended or adjusted under 35 U.S.C. 154(b) by 535 days.

(21) Appl. No.: 12/594,103

(22) PCT Filed: Mar. 12, 2008

(86) PCT No.: PCT/GB2008/000862
§ 371 (c)(1),
(2), (4) Date: Feb. 19, 2010

(87) PCT Pub. No.: WO2008/119930
PCT Pub. Date: Oct. 9, 2008

(65) Prior Publication Data
US 2010/0177650 A1    Jul. 15, 2010

(30) Foreign Application Priority Data

Mar. 30, 2007 (GB) .................................. 0706283.9

(51) Int. Cl.
*H04J 1/16* (2006.01)
(52) U.S. Cl.
USPC .......................................... 370/252; 709/224
(58) Field of Classification Search
USPC ................. 370/229–235, 241–248, 252, 253; 709/224–226, 229, 230, 232, 233, 235, 240
See application file for complete search history.

(56) References Cited

U.S. PATENT DOCUMENTS

| | | | |
|---|---|---|---|
| 6,430,154 B1 | 8/2002 | Hunt et al. | |
| 6,701,363 B1 * | 3/2004 | Chiu et al. | ..................... 709/224 |
| 6,718,380 B1 | 4/2004 | Mohaban | |
| 6,807,156 B1 | 10/2004 | Veres et al. | |
| 6,816,903 B1 | 11/2004 | Rakoshitz et al. | |

(Continued)

FOREIGN PATENT DOCUMENTS

| | | |
|---|---|---|
| EP | 1 351 441 | 10/2003 |
| WO | WO0161492 | 8/2001 |

(Continued)

OTHER PUBLICATIONS

Search Report issued in priority Application No. GB0706283.9.

(Continued)

*Primary Examiner* — Kan Yuen
(74) *Attorney, Agent, or Firm* — Nixon & Vanderhye P.C.

(57) ABSTRACT

Methods and systems for deriving measures indicative of application-level quality of service in relation to a client application operating in a data network whereby application data of relevance to the client application is transmitted in packets from node to node over the network by means of a plurality of application flows, each application flow being an exchange of dat between the client application and a serving application; the method comprising: monitoring characteristics of packets containing application data of relevance to the client application and identifying an application flow associated with each packet; determining from monitored characteristics, according to predetermined criteria and individually in relation to each of a plurality of application flows associated with the client application, a flow-level performance measure; and collating the respective flow-level performance measures and deriving an application-level service-quality measure.

23 Claims, 9 Drawing Sheets

(56) References Cited

U.S. PATENT DOCUMENTS

| | | | |
|---|---|---|---|
| 6,857,020 B1 | 2/2005 | Chaar et al. | |
| 7,656,801 B1* | 2/2010 | Rockwood et al. | 370/235 |
| 2002/0038366 A1* | 3/2002 | Harasawa | 709/224 |
| 2004/0049576 A1 | 3/2004 | Schweitzer | |
| 2004/0257994 A1 | 12/2004 | Paskett | |
| 2005/0097206 A1* | 5/2005 | Rabinovitch et al. | 709/224 |
| 2006/0020703 A1* | 1/2006 | England et al. | 709/226 |
| 2006/0146729 A1 | 7/2006 | Krautkremer et al. | |
| 2006/0146874 A1* | 7/2006 | Yuan et al. | 370/468 |
| 2007/0011317 A1 | 1/2007 | Brandyburg et al. | |
| 2007/0061433 A1 | 3/2007 | Reynolds et al. | |
| 2007/0121520 A1* | 5/2007 | Shrikhande et al. | 370/252 |
| 2007/0168494 A1* | 7/2007 | Liu et al. | 709/224 |

FOREIGN PATENT DOCUMENTS

| | | |
|---|---|---|
| WO | 03/075522 | 9/2003 |
| WO | WO 2005/096138 | 10/2005 |
| WO | WO 2007/030916 | 3/2007 |
| WO | WO 2008/119929 | 10/2008 |

OTHER PUBLICATIONS

Garvey M. J., "Going with the flow," Nov. 28, 2005, Information WEEK CMP Media Inc., pp. 51-52.

International Search Report and Written Opinion in related International Application No. PCT/GB2008/000850.

Search Report issued in related GB Application No. GB0706313.4.

International Search Report for PCT/GB2008/000862, mailed Aug. 4, 2008.

Mandato D: "Concepts for Service Adaptation, Scalability and QOS Handling on Mobility Enabled Networks", Internet Citation, XP002241854.

* cited by examiner

| APPLICATION | APPLICATION TURN | CONSTITUENT FLOWS Flow  Weight |
| --- | --- | --- |
| Procurement System A | Get Product Info | Flow 1   50%<br>Flow 2   25%, X<br>Flow 3   12.5%, X<br>Flow 4   12.5%, X |
| Procurement System A | Confirm Order | Flow 5   100%, X |
| Procurement System A | Make Payment | Flow 6   50%<br>Flow 7   50%, X |
| Procurement System A | Search Help | Flow 8   50%<br>Flow 9   50% |
| Procurement System A | Other | Other |
| Order System B | Get Product Info | Flow 8   50%<br>Flow 9   25%<br>Flow 10  12.5%<br>Flow 11  12.5% |
| Order System B | Confirm Order | Flow 12  100% |
| Order System B | Make Payment | Flow 13  75%<br>Flow 14  25% |

Figure 2

Example Application Flow Measures and Targets

| APPLICATION | TYPE | TARGET BANDWIDTH (kbps) | Target Packet LOSS (%) | Maximum DELAY (ms) | Maximum JITTER (ms) | QUALITY (red/amber/green) |
|---|---|---|---|---|---|---|
| VoIP | Real Time | 32 | 0 | 50 – 100 | 50 – 100 | Special MOS |
| SAP | Transaction | 50 | 2 - 4 | 100 - 200 | n/a | Amber = Delay between 100 and 150. Red = delay > 150. |
| ORACLE | Transaction | 20 | 3 - 5 | 100 - 300 | n/a | Custom formula |
| CEO Video Broadcast | Real Time | 1500 | 0 - 1 | 100 - 200 | 50 - 150 | Special MOS |
| Video Conference | Real Time | 500 | 0 - 1 | 100 - 300 | 50 - 150 | Special MOS |
| Internet | Background | 30 | 3 - 5 | 400 - 600 | n/a | Amber = Bandwidth between 25 and 30. Red = Bandwidth < 20. |
| EMAIL | Data | 25 | 3 - 5 | n/a | n/a | Av. over 1 min, Av. over 10 min |
| FTP | Background | 25 | NA | n/a | n/a | Amber = Bandwidth between 20 and 25. Red = Bandwidth < 20. |
| Unclassified | Background | 10 | NA | 1000 | n/a | None |

Figure 3

| APPLICATION | BUSINESS PRIORITY (1 to 10, high = most important) | APPLICATION TURN | CONSTITUENT FLOWS Flow | Weight |
|---|---|---|---|---|
| Procurement System A | 3 | Get Product Info | Flow 1<br>Flow 2<br>Flow 3<br>Flow 4 | 50%<br>25%, X<br>12.5%, X<br>12.5%, X |
| Procurement System A | 1 | Confirm Order | Flow 5 | 100%, X |
| Procurement System A | 1 | Make Payment | Flow 6<br>Flow 7 | 50%<br>50%, X |
| Procurement System A | 5 | Search Help | Flow 8<br>Flow 9 | 50%<br>50% |
| Procurement System A | 8 | Other | Other | |
| Order System B | 3 | Get Product Info | Flow 8<br>Flow 9<br>Flow 10<br>Flow 11 | 50%<br>25%<br>12.5%<br>12.5% |
| Order System B | 1 | Confirm Order | Flow 12 | 100% |
| Order System B | 1 | Make Payment | Flow 13<br>Flow 14 | 75%<br>25% |

Figure 5

Example Application Flow Measures and Targets

| APPLICATION | TYPE | TARGET BANDWIDTH (kbps) | Target Packet LOSS (%) | Maximum DELAY (ms) | EFFECTIVE PRIORITY (1 = HIGH) (10 = LOW) | QUALITY (red/amber/green) |
|---|---|---|---|---|---|---|
| VoIP | Real Time | 32 | 0 | 50 – 100 | 10 | Special MOS |
| SAP | Transaction | 50 | 2 - 4 | 100 - 200 | 8 | Amber = Delay between 100 and 150. Red = Delay > 150. |
| ORACLE | Transaction | 20 | 3 - 5 | 100 - 300 | 8 | Custom formula |
| CEO Video Broadcast | Real Time | 1500 | 0 - 1 | 100 - 200 | 8 | Special MOS |
| Video Conference | Real Time | 500 | 0 - 1 | 100 - 300 | 8 | Special MOS |
| Internet | Background | 30 | 3 - 5 | 400 - 600 | 4 | Amber = Bandwidth between 25 and 30. Red = Bandwidth < 20. |
| EMAIL | Data | 25 | 3 - 5 | n/a | 3 | Av. over 1 min, Av. over 10 min |
| FTP | Background | 25 | NA | n/a | 2 | Amber = Bandwidth between 20 and 25. Red = Bandwidth < 20 |
| Unclassified | Background | 10 | NA | 1000 | 1 | None |

Figure 6

DATA NETWORK MONITORING SYSTEM AND METHOD FOR DETERMINING SERVICE QUALITY MEASURE

This application is the U.S. national phase of International Application No. PCT/GB2008/000862 filed 12 Mar. 2008, which designated the U.S. and claims priority to Great Britain Application No. 0706283.9, filed 30 Mar. 2007, the entire contents of each of which are hereby incorporated by reference.

TECHNICAL FIELD

The present invention relates principally to a data network monitoring system and method. Aspects of the present invention also relate to network resource allocating systems and methods, and to data network provisioning systems and methods which use data obtained by means of the above-mentioned data network monitoring system and method, and to systems and methods for specifying transactional level service guarantees, normally referred to as "service level guarantees" (SLGs), enforcing them within a multi-site network such as a corporate Internet Protocol-based Virtual Private Network (IP-VPN), and underwriting them with the automatic resolution of the punitive consequences for the breach of such guarantees.

BACKGROUND

Modern corporate wide area networks (WANs) often take the form of internet protocol-based virtual private networks (IP-VPNs) which make use of multi protocol label switching (MPLS). IP-VPNs are flexible and allow corporate users to share network infrastructure while giving the appearance of private network use. Typically the shared network infrastructure is provided by a particular network service provider, although it can be provided by the public internet.

MPLS IP-VPNs are designed and delivered to meet specific traffic volumes at anticipated qualities, of service (QoS). The bandwidth and other QoS requirements are typically translated into appropriate router settings for each corporate site accessing the IP-VPN, using for example DiffServ (Differentiated Services, a model defined by the Internet Engineering Task Force) to define class of service (CoS) ratios which categorise traffic into different Assured Forwarding (AF) classes.

The router settings are usually applied through the network service provider provisioning workflow and provisioning Operational Support System (OSS) infrastructure. As a result, any change to service is typically handled as a change control, engaging the full OSS stack, and can take typically from a few hours to a few days, weeks or even months to implement, depending on how many sites are involved and the complexity of the changes required.

However, there is a growing need for service providers to provide applications on-demand (for example video broadcasting and video conferencing through an IP-VPN). Furthermore, the introduction of a wide range of eBusiness services is beginning to place unpredictable and "bursty" demands on corporate networks.

Moreover many transactions which may appear as a simple mouse-click to the end user are in fact highly complex in terms of network usage. A simple example is the load of a web page, which may result in multiple application flows to different servers to produce the constituent text and graphics, perhaps one for order catalogue information, one for stock availability, and one for company information, each flow being across a different network path to a different server.

In order to guarantee the performance of such applications and thus enable businesses to run effectively, it would be desirable for the network to adapt in real time to knowledge of the application and the overall transaction, against pre-defined targets associated with what constitutes a good user experience for the application. Furthermore, if the network fails to adapt within the current provisioning, it would be advantageous if action were automatically taken to re-provision based on policies agreed with the end-client and the service provider as part of the Service Level Guarantee (SLG). Furthermore if an SLG cannot be met by any means, it would be advantageous if the network were able to deliver punitive compensation automatically. Clearly this is not possible with the "typical" OSS stack previously summarised.

PRIOR ART

U.S. Pat. No. 6,816,903 B1 (Rakoshitz et al) outlines a network monitoring, profiling, and optimisation system based on probes positioned at the customer edge of the network. Rakoshitz teaches that each individual application flow can be identified by its protocol, URL, or other means, and allocated a quality class, according to which traffic engineering is performed (for example priority queuing), in order to prioritise important application flows over less important flows. This technique is now common in WAN optimisation systems such as Packeteer™ (see www.packeteer.com) and Juniper™ (see www.juniper.net). According to the system described in this document, each "application flow" is handled separately according to its designated quality class, without relating a combination of flows to the real experience of the end user.

The present inventors have recognised that as far as the end user is concerned, an action that is perceived as a single application turn or transaction can result in the initiation of multiple application flows, not just a single flow, and that in general, it is the combination of such underlying flows handled together that can provide a representative quality measure, and any quality enforcement aimed at the end user would require handling of such flows together, not independently. The present inventors have recognised that Rakoshitz does not address this point. Secondly within Rakoshitz, the quality of service for priority classes is handled by traffic engineering devices at the edge of the customer's network. These devices squeeze as much performance as possible out of the network provisioned to the client. However, in the event of not being able to achieve the required level of quality through these optimisation techniques, Rakoshitz goes no further than firing an alert, i.e. where optimisation is not enough and resources are exceeded, Rakoshitz does not address the automatic resolution of the quality problems. Finally Rakoshitz has described no concept of the automatic handling by the network of punitive compensation for any recognised SLA breach.

WO 01/61492 (Aprisma Management Technologies) covers general principles of monitoring and alerting which are already well understood within the industry.

M. Hashmani, M. Joshida, T. Ikenaga and Y. Oie, "Management and Realization of SLA for Providing Network QoS", P. Lorenz (Ed.): ICN 2001, LNCS 2093, pp. 398-408, 2001 consider a QoS Enabled Network which can provide guarantee of QoS because a Bandwidth Broker manages its resources based on a policy. Hashmani proposes a methodology of machine-readable Service Level Objective templates to negotiate and commit service levels. There is however no concept within Hashmani of a combination of application flows representing a true application experience. Also, Hashmani does not teach resolution of application level failures using policy-based provisioning, and Hashmani proposes no system for punitive compensation in the event of Service Level Agreement (SLA) breaches.

U.S. Pat. No. 6,857,020 (Chaar et al) is an example of a system for managing QoS assured eBusiness systems. A Service Level Agreement manager receives monitoring events generated by SLA monitors when the system does not conform to quality measures. These quality measures include: service system availability/reliability, transaction service time, end-to-end transaction response time, network connection bandwidth, change latency of on-demand capacity allocation, and monitored problem resolution response time. The SLA manager determines which SLA contracts are affected by the monitoring events. SLA management objects then determine how to allocate/de-allocate/configure computing and personnel resources to assure a contracted QoS.

Thus, while U.S. Pat. No. 6,857,020 goes some way to assuring implementation of QoS contracts, it does not provide a mechanism for the combination and management of multiple application flows, nor does it recognise the handling of punitive compensation as part of the network. Further, it is intended for back-office rather than instantaneous processing.

US Patent Application 2005/0076154 (Chambliss et al) concerns storage networks. Service level guarantee definitions indicate performance criteria to satisfy service requirements included in SLAs. However, this document does not address the issue of what to do if SLAs are breached, and does not concern the combination of application flows.

U.S. Pat. No. 6,529,950 (Lumelsky et al) proposes a Resource Management Framework for managing distributed multimedia resources on wide area networks. Policies are used to determine which services to apply to customers. Although using terminology such as "policy" and "resources", this document does not concern management and optimisation of networks against application level SLAs.

US Patent Application 2003/0206517 (Grenot et al) relates to a dynamic optimisation process of QoS requirements in a data transmission packet network. The process seeks to maximise QoS by minimising delay period, jitter and loss. This does not address the combination of multiple application flows, does not address handling of provisioning outside of optimisation limits, and does not handle punitive compensation for SLA breaches.

U.S. Pat. No. 6,807,156 (Veres) relates to methods and systems of identifying and determining degradation of QoS perceived by a subscriber in a network such as the Internet. Traffic of individual applications of the subscriber and aggregate traffic of a subscriber are monitored, captured, and processed to produce QoS statistics. End-to-end QoS metrics are provided for TCP connections based on the observation of packet flows at a single monitoring point. The QoS metrics include, for example, packet loss internally and externally to the monitoring point, detection of stalled periods and estimation of path delay.

U.S. Pat. No. 6,701,363 (Chiu et al) discloses a method of relating characteristics gleaned by monitoring application transaction flows (and the decomposition thereof) to produce performance metrics useful for characterising the efficiency and performance of web transactions used in a web-based application. These metrics can assist application designers and developers in reorganising their application content, programs, and transports to provide improved service to their consumer.

US Patent Application US 2006/146729 (Krautkremer et al) relates to methods and apparatus for using an application layer demarcation point. One method comprises monitoring end-to-end performance of a network application at an application demarcation point in a network, and mediating between provider infrastructure and customer infrastructure based on results of monitoring.

US Patent Application US 2007/011317 (Brandyburg et al) relates to analysing traffic on a network by monitoring packets sent between devices on the network and identifying applications occurring between devices on the network based on information derived from monitoring the packets. Techniques are provided to examine information such as that in the header of IP packets, to identify applications occurring on the network. In some cases, information about the packet beyond the header information is examined to match a packet to a particular application. Using these techniques, a list is built of the applications occurring between devices on the network. Parameters may be generated to track response time, latency and traffic volume associated with a particular device on the network.

The article "Going With The Flow" by M. J. Garvey (Information Week, Nov. 28, 2005, pages 51-52) discusses flow-based monitoring, and how this may be used to provide useful information such as application performance and bandwidth usage.

SUMMARY OF THE INVENTION

Preferred embodiments of the present invention may use the monitored characteristics of individual transmitted data packets and application flows, and collation of related flows in a monitored client application (i.e. this may be in respect of a particular "transaction" or application turn), to produce compliance with a predetermined service level guarantee for the application. The phrase "application turn" can refer to an action by an end-user that would be considered to be a single step in the use of a client application—for example a mouse-click to download a web page, or a double-click to start up an application. Although this may be considered by the end-user as a single step and a single instruction, it may comprise multiple underlying application flows between an end-user's PC and one or more supporting servers and software applications. A single "application turn" may also result in a "knock-on" effect of application flows between a server contacted and other servers that play a role in fulfilling the instruction. The end-user in this definition is not necessarily a person; the same concept may instead relate to situations wherein one application calls another application.

The constituent flows may be modified, by engineering each flow, to try and meet performance targets within the SLGs. Where the SLGs cannot be met, a policy manager may determine the appropriate action automatically, generally in less than a second. The appropriate action may involve modification of the underlying network provisioning to restore adherence with the SLG, and/or punitive delivery of service credits or refunds according to the terms of the SLG.

Preferred embodiments of the invention may provide the means to modify overall provisioning instantaneously, according to an application level SLG, and to restore compliance with the SLG. They may also include, as an integrated part of a system, means allowing any poor end-user experience to be related to Service Level Agreement (SLA) breach and instantaneously and automatically enforce punitive compensation.

Preferred embodiments of the invention may involve or enable any or all of the following:

(a) the collation of multiple application flows into a representative form for the application as experienced by the user, with an appropriate application level quality measure, and the handling of measurement, and breaches according to this measure.

(b) optimisation of the network according to this primary measure of the application as a combination of multiple application flows, wherein the appropriate handling of all underlying and contributing application flows is arranged to meet a primary application quality measure.

(c) where optimisation is not enough, and the required performance cannot be obtained using the existing network, automatic resolution by temporary additional provisioning of the service providers network according to policies.

(d) where b) and c) together do not automatically restore the conditions required under the SLG, automatic and instantaneous effecting of punitive compensation by the network.

BRIEF DESCRIPTION OF THE FIGURES

Embodiments of the invention will now be described by way of example with reference to the accompanying drawings in which:

FIG. 2 is a table illustrating example relationships between application flows, transactions, and network applications.

FIG. 3 is a table showing example application flow measures and targets.

FIG. 5 shows the table of FIG. 2 expanded to include exemplary business priorities.

FIG. 6 shows a table similar to FIG. 3 also including "Effective Priority" values for the flows.

DETAILED DESCRIPTION OF EMBODIMENTS

Figure 1:
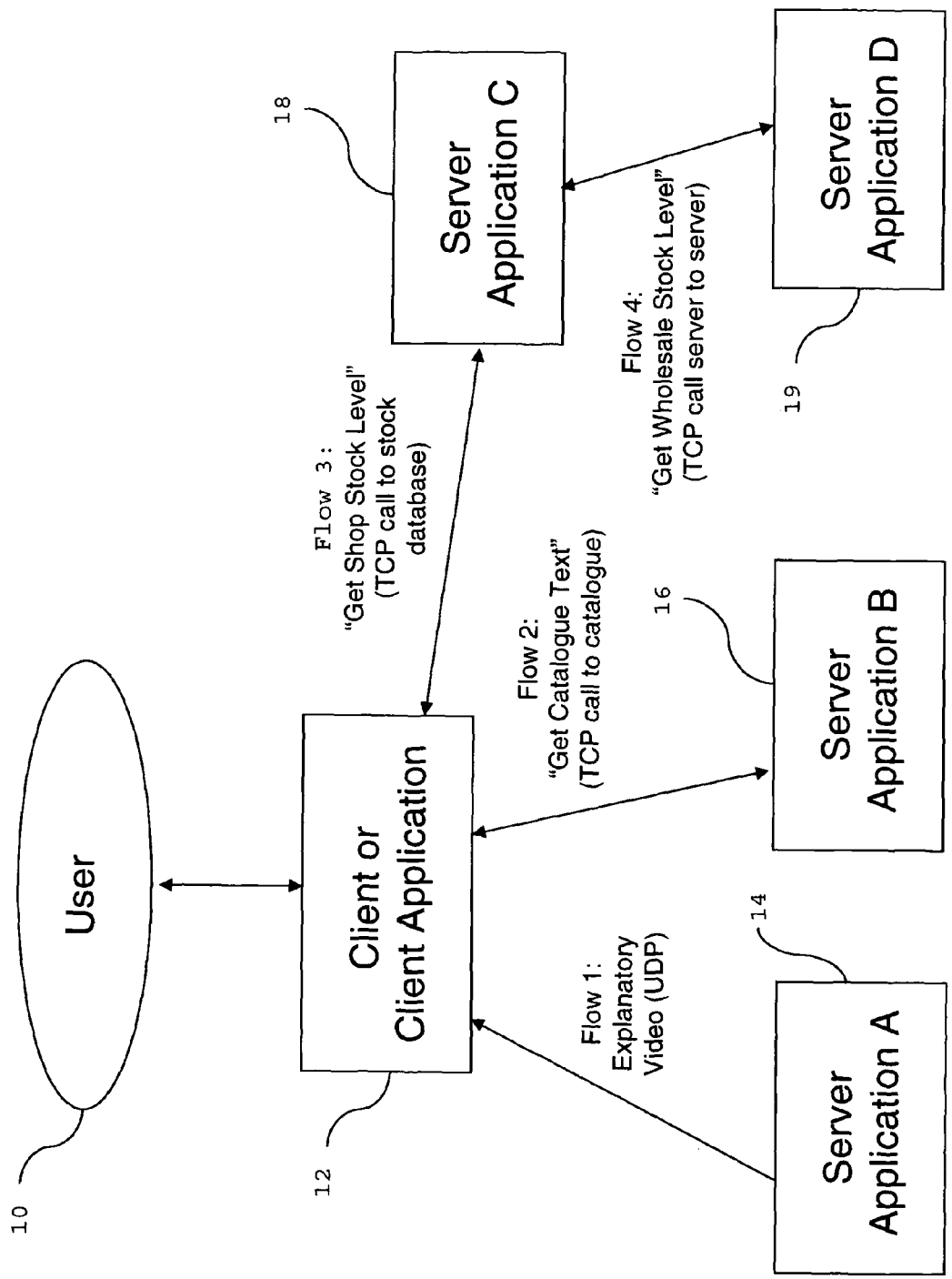
FIG. 1 shows an example procurement system and illustrates how multiple application flows can have an impact on the overall user experience of a client application.

Firstly, with reference to FIG. 1, we describe an example procurement system in order to illustrate how multiple application flows may have an impact on the overall user experience in relation to a client application. FIG. 1 shows a user 10 interacting with a user terminal or client 12 which may be running a standard web-browser application such as Internet Explorer™, Mozilla Firefox™ or Netscape™, or may be any client application 12 interacting with servers over a network. In this example, user 10 wishes to perform a function of getting product information, for example, clicking on a "get product information" link on the website of a client organisation.

In order to fulfil the user request, the client application 12 makes a variety of server requests. The client application connects to or calls "Server Application A" 14 in order to obtain catalogue images or explanatory video, connects to or calls "Server Application B" 16 in order to perform a "Get Catalogue Text" function, and connects to or calls "Server Application C1" 18 in order to perform a "Get Shop Stock Level" function. In response to the client application's call to perform this third function, "Server Application C1" in turn calls or connects to "Server Application C2" 19 in order to perform a "Get Warehouse Stock Level" function. Each of these functions initiated by the client application 12 involves a separate application flow, a flow being a sequence of packets associated with a single client/server call. The call to "Server Application A" 14 to obtain explanatory video may involve the initiation of streaming flow back to the client application 12 carried by the UDP protocol; the call to "Server Application B" 16 for the "Get Catalogue Text" function may result in an application flow carrying the response data underpinned by the TCP protocol; the call to "Server Application C1" 18 for the "Get Shop Stock Level" function may involve another flow supported by TCP, this time between the client application and a stock database; and the call to "Server Application C2" 19 for the "Get Warehouse Stock Level" function may involve a server-to-server TCP connection between "Server Application C1" 18 and "Server Application C2" 19.

Whilst some traditional network systems are concerned with the quality of packets or individual packet flows, the end user experience is typically the result of the combined performance of a number of flows underlying the application request. While the user 10 in the above example may regard a single request such as this "Get Product Information" request as a single "application turn", each of the underlying flows may in fact contribute to the performance at the "user level" of this application turn, and may therefore affect the user-perceived experience in relation to the client application. Specifically, following the "get product information" request, the user receives in one turn the combination of images or an explanatory video from "Server A" 14 via Flow 1, textual catalogue information from "Server B" 16 via Flow 2, and stock information via Flow 3 from "Server C1" 18, which itself has needed to retrieve further stock information relating to a reserve stock system from "Server C2" 19 via Flow 4. The user thus perceives an experience that is dependent on the quality of each of the respective flows, plus the response is times of each server request.

In order for performance to be measured against a service level agreement, we introduce the concept of a "Combined Application Flow Quality Measure" (CAFQM). The CAFQM is explained as follows, using the simple web example set out above. It should be noted however that the CAFQM is not limited to web embodiments.

The CAFQM is a single quality measure for the application turn that is derived by combining information on underlying flows according to factors such as their importance to the application turn, the actual performance of the flow, and whether the flow is a critical failure point (i.e. whether the whole application turn would fail if the flow in question fails). By collating such information relating to the underlying flows relevant to an application turn perceived as a single turn by the user (here we term this the "transaction"), the CAFQM can be used to predict the overall transaction quality as perceived by the end user. In the system to be described, this may, for example, deliver four divisions of transaction quality such as "High", "Tolerable", "Poor", and "Failure" (which may be termed "Green", "Amber", "Red", and "Black"). This in turn may be calculated from the quality values for each underlying application flow and their weighted importance to the end-user experience.

FIG. 2 is a table illustrating example relationships between application flows, transactions, and the application. In FIG. 2, Procurement System A represents the example of FIG. 1. Each key transaction (i.e. each transaction requiring service level assurance) is identified and is then related to the constituent flows, which are in turn allocated a weighting of how the performance of these flows may contribute to the overall perceived performance to the end user for the specific transaction. In the system to be described, the single scheme of a percentage contribution is used, although other weighting schemes could be incorporated. Thus the transaction "Get Product Information" has 50% of the performance quality determined by Flow 1, 25% by Flow 2, 12.5% by Flow 3 and 12.5% by Flow 4. Flows 2, 3, and 4 are shown as having an additional special designation "X"—this indicates that total failure of the flow (or condition "black") would be likely to result in total failure (as perceived by the user) of the transaction. In the example, this recognises that whilst poor performance for Flows 2, 3 or 4 may have only a 25% or less contribution to the overall perceived quality (e.g. a slow response), total failure of any of these flows would result in total perceived failure of the transaction (in this case not receiving catalogue or stock information at all). By contrast video quality may contribute significantly to the perceived quality where a poor quality video would give a poor experience, yet failure of the video flow altogether would not stop the user from checking catalogue information and stock.

The CAFQM is then calculated by an appropriate summation of the constituent flows, as in the following example, though the formula may of course vary:

If any contributing flow marked X="Black" then
CAFQM="BLACK" else CAFQM=sum over all
flows for the transaction of (quality*weighting)
where quality is 0 for "black", 1 for "red", 2 for
"amber", and 3 for "green".

Using again the example of FIG. 1, if Flow 1 is "Green", Flow 2 is "Amber", Flow 3 is "Green", and Flow 4 is "Red", the CAFQM is 3*0.50+2*0.25+3*0.125+1*0.125=2.5. This is equivalent to "Amber", using the scheme:

<1 is Black, >1 and <=2 is Red, >2 and <=3 is
Amber, >3 is Green.

The quality of each application flow also needs to be determined, in order to input to this calculation, which depends on the type of flow and specific network measures. The table in FIG. 3 shows example application flow measures and targets.

With reference to FIG. 3, the quality of each underlying application flow is calculated from measurements by probes (which will be explained later with reference to FIG. 4A), using the range of normal network parameters, including but not limited to IP measures such as delay, jitter, loss, bandwidth, and packet loss, and TCP measures such as server response time (SRT), round trip time (RTT), and re-transmission.

The individual flows are recognised as belonging to certain applications by inspecting the contents of TCP/IP packets, from layer 2 through to layer 7 in the OSI stack, including but not limited to IP address, port, URL, a pattern match on a URL, application header and application payload. This may be done using measurement techniques such as Deep Packet Inspection (DPI) already known in the industry for other purposes. Use of such techniques within the present system, however, is to inspect packets as deeply as is required to uniquely identify the flow of which each packet forms a part. If this is possible with source and destination IP address, then IP addresses may be used; if this is not possible then port number may be tried; if this is not possible, URL or application header may be tried; and so on. In addition, where the contents of the payload needs to be checked as fit for purpose, for example to check whether an information response has the actual data or an error code, similar DPI techniques may be employed to scan the payload against error indicators.

In this example (FIG. 3), in order to determine "Green", "Amber", "Red", or "Black" for each application flow, the flows are assigned target measures for each of the individual measured network parameters, and in the final column a calculation is provided as to the overall quality of the application flow based on performance against the individual target measures. In the table, examples of such measures are provided rather than an exhaustive list. Where this table shows target values in a range for example "50-150", any value below the lower value is the acceptable flow performance GREEN, any value within the range is an amber condition, and any value above the higher number is a RED condition. The further calculations in the final column provide the overall quality measure for the flow and the overall RED, AMBER, GREEN, or BLACK designation, which is in turn used in the master CAFQM calculation. The "BLACK" condition is derived by inspecting the payload of the flow against valid responses, typically this checks for error codes returned instead of valid content such as a web page. Example formulae are shown for the calculation of "Green", "Amber", "Red", or "Black". The actual calculations of the individual application flow quality may be performed according to known methods such as Mean Opinion Scoring (MOS) which is known in relation to voice systems such as Voice over Internet Protocol (VoIP), or as described in the "Rakoshitz" document referred to above.

Figure 4A:
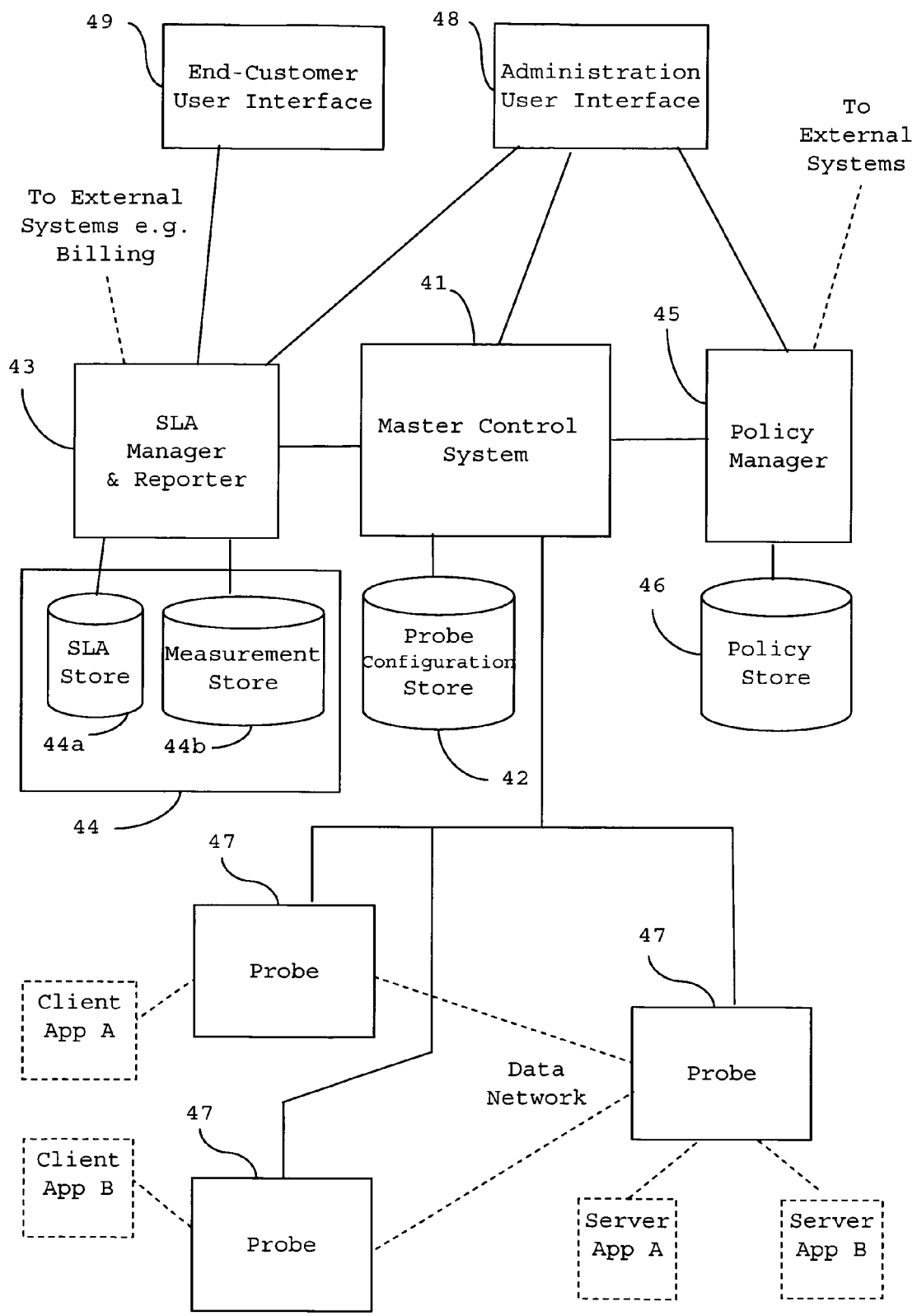
FIG. 4A shows the components of a data network monitoring system according to a preferred embodiment of the invention.

FIG. 4A shows an implementation of a system for deriving a CAFQM according to a preferred embodiment of the present invention. The primary components are:

The Master Controller 41 and its associated Probe Configuration Store 42.
The SLA Manager/Reporter 43 and its associated store 44 of SLA terms and application performance reports.
The Policy Manager 45 and its associated Policy Store 46.
The Probes 47, which monitor application flow performance (see step 100 in FIG. 8) and report this back to the Master Controller 41
The Administration User Interface 48, which is used as a single touchpoint for manually configuring Master Controller 41, SLA Manager 43, and Policy Manager 45.
An End-Customer User Interface 49, aimed at managers in the customer's business, rather than the administrator of the system.

The components shown in broken lines in FIG. 4A do not need to be considered as part of the system for deriving a CAFQM, but are included in order to assist in providing an explanation of the system.

Administration User Interface 48 is first used to configure Master Controller 41. Each Application Turn of interest (i.e. each turn to be given a CAFQM) is defined within Master Controller 41, by setting an appropriate name for the Application Turn and a reference to the underlying contributory flows. The formula for calculation of the CAFQM is selected (such as that described above) and the thresholds are set for "Red", "Amber" and "Green", as are the conditions for "Black" (for example any critical flow with "Designation X" not working).

Figure 8:
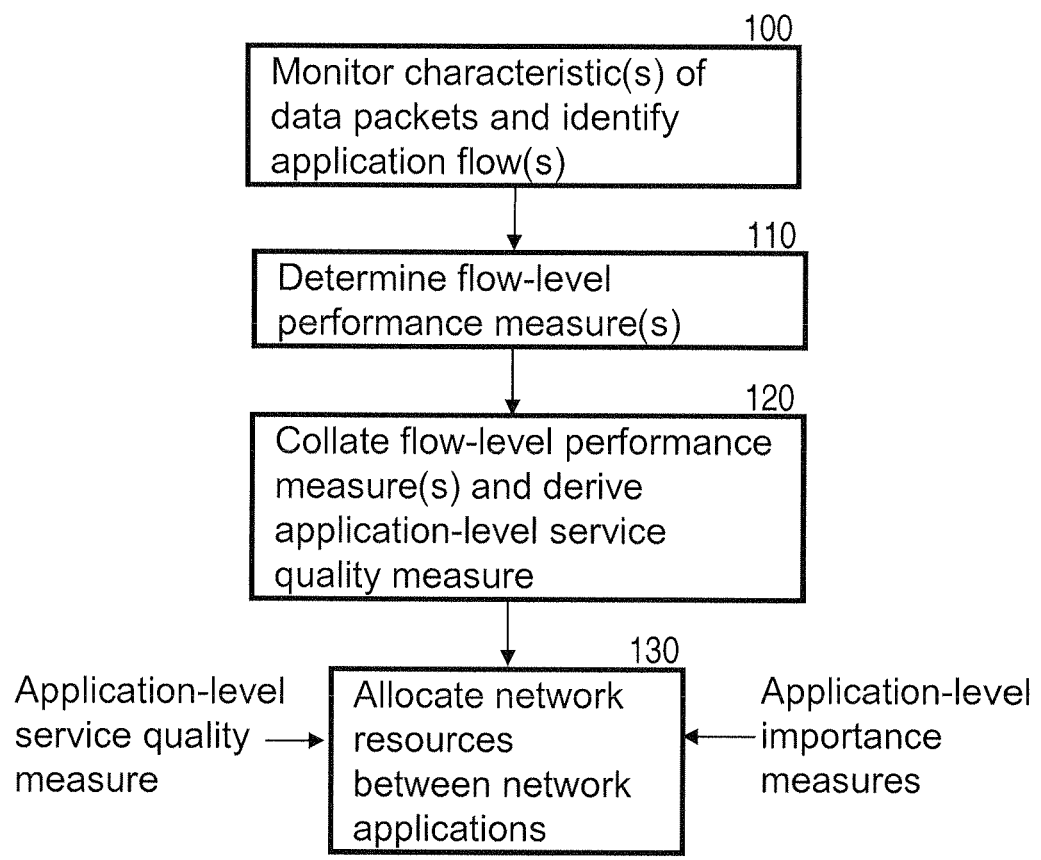
FIG. 8 shows a flow chart illustrating an example method in accordance to an embodiment of the invention.

For each Application Turn with a CAFQM, the underlying contributory flows are also assigned a name and are defined in terms of the means to identify the application flow (such as a search on a URL string or a port number) (see step 100 in FIG. 8). For each flow the means to calculate the flow's contribution to the CAFQM is also defined (see steps 110-120 in FIG. 8). This may include:
the % weight of the importance of the flow to the CAFQM
whether there is a special failure designation X and how to calculate the failure condition (for example by recognising an error code in the payload).

what flow measurement formula is to be used (e.g. a special Mean Opinion Score or a custom combination of measures such as packet loss and delay)

any restrictions on the source and destination addresses in terms of source and destination IP address, address ranges, or subnet. This may range from a specific user at a specific IP address considering flows from a specific data centre or server only, through to all users for a site interacting with flows from any data centre, right through to a single measure for the whole network topology.

Administration User Interface 48 is also used to configure Master Controller 41 with the topology and IP addresses of the probes 47. The probes 47 are typically located just LAN side of the router which connects the LAN to the data network, which typically sees all network traffic. The probes can be "in line" or connected to an ethernet switch port, provided this port is configured to see the network traffic. If "Resilient" models are required with dual access networks, a probe can be used LAN side of each access router, or any other deployment model consistent with the measurement techniques applied. Details of the network node topography (i.e. routers, switches, firewall, etc.) though important to deployment, are not of particular relevance here, and are therefore not shown in FIG. 4A.

The Master Controller 41 instructs the probes 47 to watch for and measure the network performance of the underlying flows relevant to each CAFQM, by applying the particular measurement formula in each case (sec step 100 in FIG. 8). The probes 47 do not calculate the CAFQMs, they identify the flows and measure the flow performance. Flow identification is performed using known DPI techniques. The performance measurement may also be derived using known techniques, for example the network delay for a packet travelling between a probe at the source and destination site, or the TCP Round Trip delay for a complete handshake between "Syn" and "Ack" messages in the TCP protocol, or the special MOS.

The performance of the relevant flows is communicated back to the Master Controller 41 every one minute or in any other specified time period, including: the number of sessions for the application seen for each source/destination addresses, and in each case the performance of the session according to the measurement formula. The performance is typically in three units:—the average over the measurement interval, the peak, and the base. For example if the measurement formula was based just on round trip delay and twenty flows were experienced for Application A for the same source and destination address within a measurement interval of one minute, then the average delay for all packets between the same source and destination address within one minute for the twenty flows would be returned, along with the delay for the fastest and slowest packet within the same time frame. Communication between the Master Controller 41 and probes 47 is either via a dedicated management network connection or is "in-band" within the data network being monitored.

These underlying flow measures are then combined by the Master Controller 41 into each appropriate CAFQM using the specified CAFQM formulae, using the information on flow performance sent back by the probes 47 (see steps 100-120 in FIG. 8). The calculations for each CAFQM are performed every five minutes or in another suitable time interval. The CAFQM values and the underlying flow averages are then passed to SLA Manager 43 for processing and for longer term storage in Measurement Store 44b. In addition, real time views of the CAFQM values and the underlying flow measures can be observed through Administration User Interface 48 using known graphing techniques, by performing plots at the end of each measurement interval for any CAFQM or flow measures of interest.

SLA Manager 43 is configured by Administration User Interface 48 to create reports on CAFQMs and underlying flow measurements using known graphing and report generation techniques, according to any historical time interval or network grouping.

In addition, using Administration User Interface 48, SLA Manager 43 can be configured with additional terms relating to the SLAs with the end-customer. This information includes the terms under which "bad performance" will be deemed a breach of contract, for example one hour of "Red" or half an hour of "Amber", or five occurrences of "Black". SLA Manager 43 can also be configured with the conditions to alert the Master Controller 41 should any breach or near breach conditions occur. These SLAs terms are stored in SLA Store 44a.

Every five minutes, or other suitable time frame, SLA Manager 43 performs a check of each CAFQM against any SLA alerting conditions, i.e. breach or near breach conditions. Should any such alert be calculated, SLA Manager 43 alerts Master Controller 41 with the alert details including the affected CAFQM and the breach or near breach condition.

Upon receipt of an alert, Master Controller 41 highlights the alert on the user interface 48 and passes the alert to Policy Manager 45. Policy Manager 45 may be a policy manager of known type (for example Fair Isaac Blaze™, or TAZZ™). The Policy Manager 45 is configured with the rules to take action on the event of any breach or near breach condition, for example to inform a resolution group or to automatically change network configuration. Policies are stored in Policy Store 46 and the Policy Manager 45 can instruct other external systems to take preventative or corrective actions.

SLA Manager 43 has an additional user interface 49 aimed at the end customer. This may be the same system as Administration User Interface 48 but with access restrictions. The purpose of End-Customer User Interface 49 is to provide simple and easily navigable summaries of SLAs and Application performance (in terms of CAFQMs) relevant to the customer's own business, and indications of underlying problem flows. In addition, SLA Manager 43 has external interfaces to other systems such as "Billing" in order to allow calculation of service credits for proven breaches of contract.

Figure 4B:
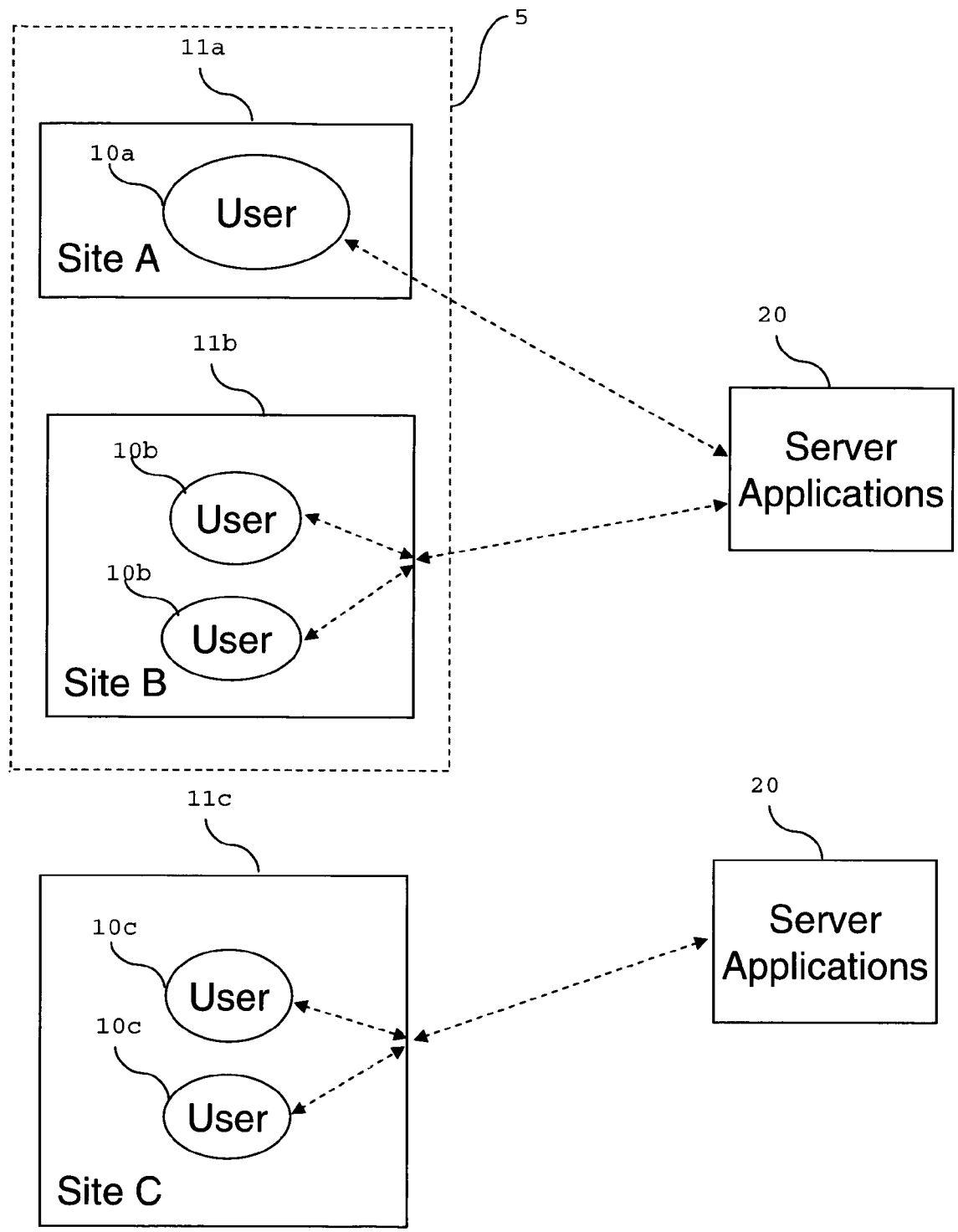
FIG. 4B illustrates a few alternative situations and topologies in relation to which a "Combined Application Flow Quality Measure" (CAFQM) may be derived.

The CAFQM may be calculated from the perspective of a particular user session, but may also be calculated for all user sessions from a particular client PC or end-point, for all sessions at a particular site, or as an overall measure across all sites. In the latter two cases, the "application flow" is then not specific to a particular user session, but may instead be the averaged quality across all flows of the same type for the collected set of data. This may then be summed in the same way as shown above to create an overall CAFQM for the transaction. With reference to FIG. 4B, a few alternative situations and topologies will be described in order to illustrate how a CAFQM may be derived in relation to such alternatives.

As explained above, the CAFQM can apply or relate to the experience of one or more applications 20 for a single user 10a at a single site 11a, for one particular user session or averaged over a period of time. The CAFQM can also apply as a single measure for multiple users 10b of the same application or applications 20 from a site 11b, averaged across user sessions for example. Alternatively the CAFQM can apply to multiple users 10a, 10b at multiple sites 11a, 11b, averaged across the different user sessions, all under the control of the same organisation 5 or its network controller, for example. Further, the same application(s) 20 may be served from different sites 11a, 11b, 11c, in which case the CAFQM may be combined or separated for each serving instance. Alternatively, it may be an appropriate variant/average across multiple users 10a, 10b, 10c, multiple sessions, multiple network paths etc. Other combinations of users, sites, applications etc. are also possible. It will be noted that multiple underlying flows are simplified to a single line in this figure.

Optimisation According to Business Priority and CAFQM Requirements

A further system that may use a monitoring system according to a preferred embodiment of the invention in relation to resource allocation will now be explained (see step 130 in FIG. 8). This relates to a system that uses one or more CAFQMs relating to one or more network applications to optimise the network according to the business priority and required quality of two or more transactions happening within the same network over approximately the same time period, or with some time overlap between them (i.e. in situations where there may be a need to apportion network resources between different network applications competing for a limited amount of network resources.

Systems such as that explained in the Rakoshitz patent referred to above approach this problem from the perspective of the application flow alone—assigning each flow a "quality class" or a priority marking subject to different grades of QoS, then using mechanisms such as packet queuing, compression of data, local caching of data, and protocol acceleration with preferential treatment for the higher priority application flows.

In the present system, the same underlying mechanisms may be used to optimise the network, but the priorities for the application flows are determined not just from a single priority assignment, but from a combination of a) the flow's importance to the overall transaction's CAFQM rating, b) whether the flow is a critical failure point for the transaction, and c) balanced against the overall importance to the business of the transaction relative to other transactions.

This combination delivers an "Effective Priority" for each flow, which when used with or within embodiments of the invention, delivers a far more efficient model for network optimisation than known techniques.

Firstly, the business priority of the overall transaction (or Application Turn) is established, for each important Application Turn. In addition the contributory flows and their importance to the CAFQM are defined as described earlier. In FIG. 5 we expand the table of FIG. 2 to include an example of business priorities, ranging from 10 (high) to 1 (low).

The Effective Priority for an application flow is not assigned directly from this business priority, but is instead derived from both a) the business priority for the overall transaction and b) the performance weighting of the flow in the CAFQM, (i.e. the impact of the flow on the perceived overall performance), in addition taking into account the special designation X.

The following scheme is an example formula for determining this "Effective Priority" for each application flow contributing to a business transaction, although variants can easily be derived from this example:

> Application flow "Effective Priority"=the same as the Business Priority for the transaction if the flow is designated as $X$
>
> Or otherwise:
>
> Business priority for the transaction multiplied by [0.25+performance weighting, rounded to 1 if above 1]

Using this particular scheme, any flow that is critical to performance, or which contributes 75% or more to performance, will have the same priority as the transaction's business priority, however flows of lower contribution to the perceived performance will have a lower priority, although another threshold other than 0.25 could be used.

Thus, although the transaction may be of a high priority to the business, it does not necessarily follow that each constituent underlying flow also needs to be high priority in order to preserve the overall customer perception of high performance for the transaction, and can be of a lower "effective priority" whilst still delivering an acceptable user experience.

This "Effective Priority" is then used to direct the optimisation of the flow relative to other flows, where the probes try to ensure performance for the highest priority flows first, according to their resource needs for acceptable running. These resource needs are indicated by the "Target" values for the flow performance. With reference to FIG. 6, the column "Effective Priority" shows example values. The "Effective Priority", derived from the transactions business priority and the CAFQM requirement as in the example above, is used together with the data flow type and the target network metrics to optimise the network flows, by means of the probes. The mechanisms for such underlying traffic optimisation may be based on that explained in the Rakoshitz patent referred to above or on others such as those used in systems such as the Juniper and Packeteer systems. [In FIG. 6, there is no specific reason for replacing the "Jitter" column with "Effective Priority", other than to prevent clutter in the table. As explained earlier, the columns Packet Loss, Delay, and Jitter are simply examples of the kinds of sub-measures that may be used in the calculation in the final column.]

Figure 7:
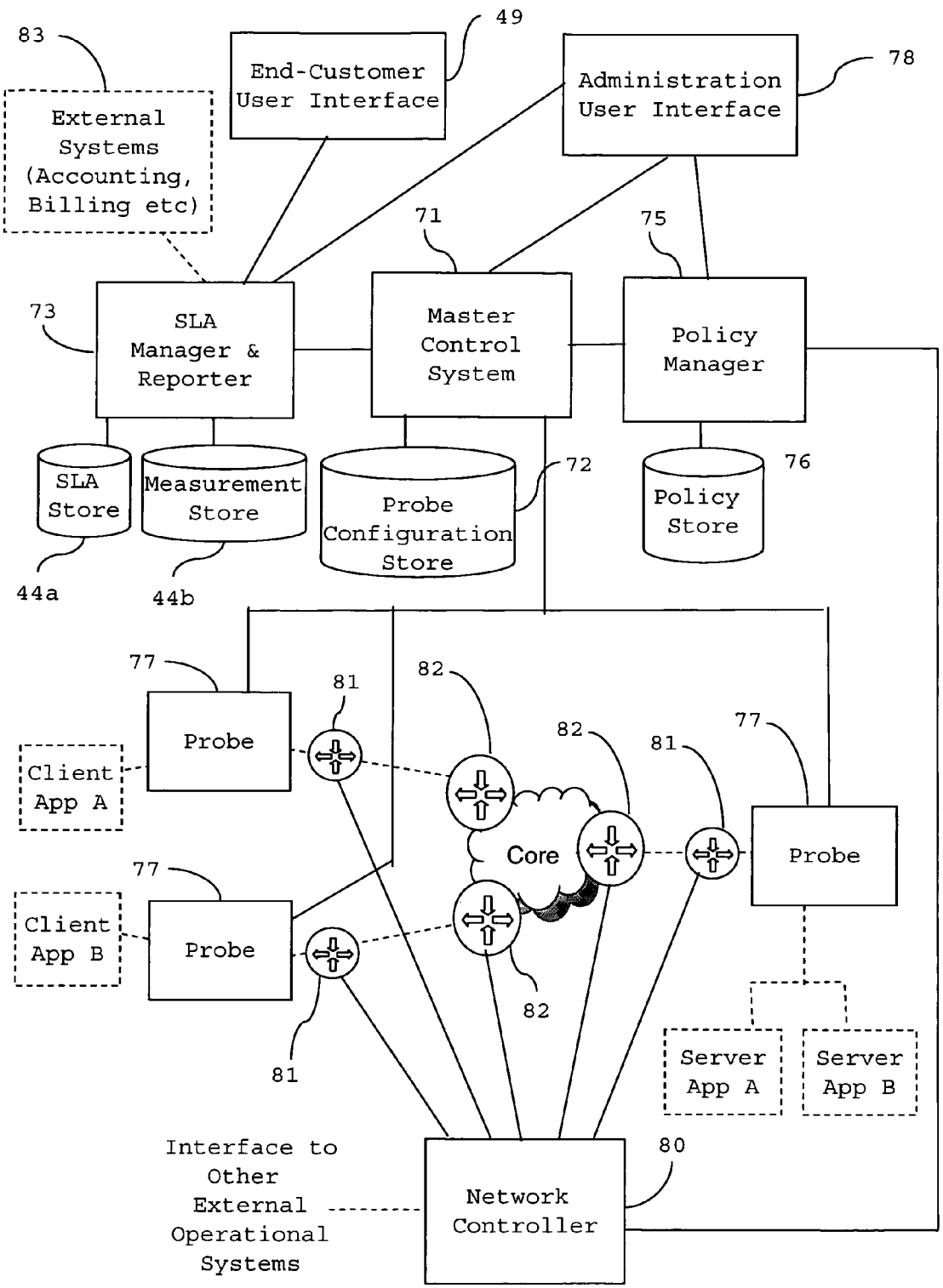
FIG. 7 illustrates a data network monitoring and resource allocation system using a preferred embodiment of the invention.

Many key components of the system of FIG. 7 correspond to those for the CAFQM monitoring system as shown in FIG. 4A. Corresponding components having corresponding functionality are shown with corresponding reference numerals. Some components however now have additional functionality in order to handle the optimisation, as follows:

- The Administration User Interface 78 is now also used to configure the Business Priorities for the transactions within the Master Control System 71, in addition to the CAFQM measures and constituent flows.
- The Master Control System 71 automatically calculates the Effective Priority for each flow type, according to the technique described above.
- The Business Priorities and Effective Priorities are stored along with the other CAFQM information in the probe configuration store 72.
- In addition to other information, the master control system 71 communicates the Effective Priorities of the transactions to the probes 77.
- The probes 77, in addition to measuring the flow performance according to the configuration given by Master Control System 71, now also perform optimisation on these flows using known techniques such as queuing, but using the derived Effective Priority rather then a business priority.

This proactive role of the probes 77 may require that the probes are connected in-line, within the path of the application flows, rather than in parallel for example from a port on a LAN switch. Again a suitable position for probe topology in the network deployment is just LAN side of the router that connects a site's LAN to the access network, as this will see most if not all traffic entering and leaving a site.

Additional Provisioning in the Event of Imminent Breach of SLG

A further system that may use a monitoring system according to a preferred embodiment of the invention in relation to network provisioning will now be explained, also with reference to FIG. 7. This relates to a system which interfaces with a Master Controller to handle exceptions where optimisation of the network is not enough to maintain the SLA. On occasion where an SLA breach is due to lack of resources, this delivers temporary additional provisioning of network resources up to the physical limits of the network.

In addition to the components described for FIG. 4A, the components of this system may perform two additional functions in particular:

The Policy Manager 75 does not just take alert information from the Master Control System 71, but also takes information on the flows that are poorly performing and the overall traffic at the affected sites.

A further component, Network Controller 80, enforces the appropriate changes at one or more configuration points on the network, at the instruction of Policy Manager 75.

FIG. 7 is a diagram showing such a system, including the relationship between the Policy Manager 75 and the Network Controller 80. Additionally, the network diagram has been expanded to show examples of key routers in the example network topology.

The Policy Manager 75 is configured by Administration User Interface 78 to include knowledge of the total bandwidth provisioning and quality of service assigned to each site within the customers network, and the IP address and logon credentials to each relevant router. Each relevant router is typically, for each customer site, the router 81 which connects the site to an access network and the router 82 that connects this access network to a core network. This information is required, as automated provisioning changes require synchronised changes to the routers at each end of the access.

On the receipt of an alert, Policy Manager 75 also receives from Master Control System 71 information on the overall bandwidth usage at the access points at both source and destination ends of the poorly performing flows. Policy Manager 75 then determines whether either of these sites is genuinely congested, by comparing the overall provisioning with the overall bandwidth usage (or similar means, for example by comparing the bandwidth used within a particular network Class of Service compared with that provisioned for the same Class). If the bandwidth used is within 90% (or other threshold) of the site provisioning, the Policy Manager 75 will infer that congestion is present and determine whether and how to temporarily upgrade the real provisioning at the site.

This is achieved by checking a range of (optional) policies using known techniques such as:

Does the contract with the customer who uses the site allow temporary upgrades?

Are temporary upgrades subject to any Quota or spend cap?

In addition network level policies are used in order to estimate a temporary upgrade requirement (for example in steps of 10% additional bandwidth until the problem is resolved), and to ensure that for each upgrade there is enough resource available at both the egress and ingress interfaces to the router. The temporary upgrade may also be cost rated and checked against a quota or a cap before being enacted. Policy Manager 75 then instructs the Network Controller 80 to make the calculated network upgrade to the target site, for example by communication with the routers at both ends of the link using "TACACS" (Terminal Access Controller Access-Control System—see Network Working Group RFC 1492 (C. Finseth), July 1993), which is an authentication/logon system for network components, and by passing the configuration changes through the standard Command Line Interface for the router. Such policy techniques may be those already known in the industry.

The Policy Manager 75 then checks with Master Control System 71 the traffic levels at each temporarily provisioned site, at intervals of one minute (or other configurable time period). When demand levels have subsided at a site for more than five minutes (or other configurable time period), network service can be restored to previous levels (i.e. the reconfiguration is reversed).

Thus, the Network Controller 80 may be configured to make the modifications at the network configuration points to produce compliance with each predetermined service level guarantee in real-time (i.e. instantaneously).

The Network Controller 80 may further be configured to modify other quality of service settings (e.g. MPLS classes of service) at the network configuration points to produce compliance with or each predetermined service level guarantee.

The Network Controller 80 may be further configured to make the modifications at the configuration points simultaneously. This helps to assure network performance across end-to-end network paths.

The bandwidth allocations modified by the Network Controller 80 may affect e.g. total bandwidth or class of service ratios at the respective network access point.

The Network Controller 80 may further be configured to reverse bandwidth allocations after a predetermined time interval. This may be by agreement with the user, at the request of an application, or a predetermined time after an application flow is found to have ceased, for example.

The Network Controller 80 may further be configured to calculate financial costs associated with changes to bandwidth allocations.

The policy manager may process, in millisecond time, business, service and network policy so that it can automatically determine corrective bandwidth reallocations at network configuration points, e.g. network routers, in response to SLA breaches or near-breaches. The policy director may then enforce these bandwidth reallocations over the network.

The policy manager may make network changes in response to explicit client or application requests. Also, the policy director may communicate with a real-time rating and charging engine that calculates the cost of on-demand network changes, and can communicate that to the client, so that the client can choose whether to proceed or not.

The Network Controller 80 may be configured to interact with other Operational Systems external to the system, for example to communicate to a master Domain Manager any temporary changes to the network that has been affected, or conversely to receive any permanent changes to network configurations from a Domain Manager.

Enforcement of Punitive Compensation

Also with reference to FIG. 7, a further use of the above system will now be described which involves automatic enforcement of contractual terms for failure to meet any commercially agreed Service Level Agreement. This principally involves components and functionality already described, and additionally involves the functionality of systems such as accounting and billing systems shown as External Systems 83 in FIG. 7.

Using the Administration User Interface 78, the SLA Manager 73 is configured with information on the consequences of a breach in SLA for an application transaction, by means of a formula to calculate these consequences. This is in addition to the information derived by a monitoring system such as that according to the preferred embodiment described earlier, including breach or near-breach conditions.

An example formula would be:—£1 refund for each minute of CAFQM in the RED or BLACK severity up to the total cost of the service billable period.

At the end of a billable period, and before the production of a bill, the normal Billing and Accounting system 83 requests breach information from the SLA manager for each contract of interest for a specified time period range (e.g. the last three months, or the last month). On receipt of this instruction, the SLA manager searches its database of SLA breach information to identify any SLA breaches within the time period for the contract and the severity (Red, Amber, Black) and length of time for each occurrence.

This information is then used by the formula (example above) to calculate for example a refund. Each refund is stored, along with a reference, in the SLA store 44a. This refund is communicated back to router 82 along with a line of explanation and the reference. The reference can then be used to retrieve the refund details from the SLA manager at a later date.

The invention claimed is:

1. A data network monitoring system for a data network having a plurality of nodes, whereby, in use, application data of relevance to a client application is transmitted in packets from node to node over the network by means of a plurality of application flows associated with said client application, each application flow being an exchange of data between the client application and one or more of a plurality of serving applications via one or more of a plurality of network paths; the monitoring system comprising:
   probes arranged to monitor one or more characteristics of transmitted data packets containing application data of relevance to said client application at one or more of said nodes, and identify an application flow associated with each of the monitored data packets;
   a processing system, comprising a computer processor, configured at least to perform:
      a flow-level performance measurement to determine from said monitored characteristics, according to one or more predetermined criteria and individually in relation to each of a plurality of application flows associated with said client application, a flow-level performance measure indicative of the performance of said application flow; and
      a collation to collate respective flow-level performance measures and to derive, according to a predetermined function of said respective flow-level performance measures, an application-level service-quality measure indicative of an application-level quality of service in respect of the client application;
   wherein the collation comprises collating respective flow-level performance measures in relation to application flows on different network paths between different serving applications and the client application whereby to derive the application-level service-quality measure.

2. A data network monitoring system according to claim 1 wherein said flow-level performance measurement is arranged to determine said respective flow-level performance measures in relation to each of a plurality of substantially contemporaneous application flows.

3. A data network monitoring system according to claim 1 wherein said flow-level performance measurement is arranged to determine said respective flow-level performance measures in relation to each of a plurality of application flows associated with one or more turns of said client application, said one or more turns being associated with a single operation as perceived by an end user of a client application.

4. A data network monitoring system according to claim 1, wherein said application-level service-quality measure is a measure indicative of a user-perceivable application-level quality of service measure.

5. A data network monitoring system according to claim 1, wherein one or more of said respective flow-level performance measures are determined in such a way as to place the performance of said application flow in one a plurality of performance level bands.

6. A data network monitoring system according to claim 1, wherein one or more of said respective flow-level performance measures are determined in such a way as to place the performance of said application flow on a continuous scale of performance levels.

7. A data network monitoring system according to claim 1, wherein said application-level service-quality measure is derived in dependence on a weighted sum of said respective flow-level performance measures.

8. A data network monitoring system according to claim 1, wherein said application-level service-quality measure is derived according to a function such that in the event that a predetermined one of said respective flow-level performance measures is indicative of flow performance below a predetermined threshold, the application-level service-quality measure is set such as to be indicative of an application-level quality of service below a predetermined level irrespective of one or more others of said respective flow-level performance measures.

9. A data network monitoring system according to claim 1, wherein the processing system of the system is further arranged to modify bandwidth allocations to different application flows to produce compliance with application-level service level guarantees.

10. A data network monitoring system according to claim 1, wherein the processing system of the system is further arranged to modify bandwidth allocations to different applications to produce compliance with application-level service level guarantees.

11. A data network monitoring system according to claim 1, wherein the processing system of the system is further arranged to determine whether application-level service level guarantees have or have not been complied with.

12. A data network monitoring system according to claim 11, the processing system of the system is further arranged to instigate punitive measures in the event that a determination is made that application-level service level guarantees have not been complied with.

13. A data network monitoring system according to claim 1, wherein said probes are arranged to monitor characteristics including any one or combination of packet size, jitter, network upstream delay, network downstream delay, bandwidth throughput, packet loss, re-transmission, network round-trip delay, and server round trip delay.

14. A data network monitoring system according to claim 1, wherein said probes are arranged to identify application flows associated with said data packets by inspecting payloads of said data packets.

15. A data network monitoring system according to claim 1, wherein the network is an internet protocol virtual private network.

16. A method for deriving a measure indicative of an application-level quality of service in relation to a client application operating in a data network having a plurality of nodes whereby, in use, application data of relevance to said client application is transmitted in packets from node to node over the network by means of a plurality of application flows associated with said client application, each application flow being an exchange of data between the client application and one or more of a plurality of serving applications via one or more of a plurality of network paths; the method comprising:
  monitoring one or more characteristics of transmitted data packets containing application data of relevance to said client application at one or more of said nodes, and identifying an application flow associated with each of the monitored data packets;
  determining from said monitored characteristics, according to one or more predetermined criteria and individually in relation to each of a plurality of application flows associated with said client application, a flow-level performance measure indicative of the performance of said application flow; and
  collating respective flow-level performance measures and deriving, according to a predetermined function of said respective flow-level performance measures, an application-level service-quality measure indicative of an application-level quality of service in respect of the client application;
  wherein said collating comprises collating respective flow-level performance measures in relation to application flows on different network paths between different serving applications and the client application whereby to derive the application-level service-quality measure.

17. A method according to claim 16 wherein said respective flow-level performance measures are determined in relation to each of a plurality of substantially contemporaneous application flows.

18. A method according to claim 16 wherein said respective flow-level performance measures are determined in relation to each of a plurality of application flows associated with one or more turns of said client application, said one or more turns being associated with a single operation as perceived by an end user of a client application.

19. A data network resource allocation system for allocating network resources between a plurality of network applications, each of said network applications having associated therewith one or more application flows, each application flow being an exchange of data packets containing data of relevance to said network application; said resource allocation system comprising:
  a processing system, comprising a computer processor, configured at least to perform:
    an application-level importance determination for determining, in respect of each of said network applications, an application-level importance measure;
    determination of, in respect of each of said network applications, an application-level quality of service measure; and
    a resource allocation for allocating network resources between said network applications in dependence on said application-level importance measures and said application-level service-quality measures;
  wherein said processing system is configured to perform the determination of application-level quality of service measures in respect of said network applications by at least deriving a measure indicative of an application-level quality of service in relation to a client application operating in a data network having a plurality of nodes whereby, in use, application data of relevance to said client application is transmitted in packets from node to node over the network by a unit of a plurality of application flows associated with said client application, each application flow being an exchange of data between the client application and one or more of a plurality of serving applications s via one or more of a plurality of network paths;
  wherein said processing system, comprising the computer processor, is configured to perform the deriving process by at least:
    monitoring one or more characteristics of transmitted data packets containing application data of relevance to said client application at one or more of said nodes, and identifying an application flow associated with each of the monitored data packets;
    determining from said monitored characteristics, according to one or more predetermined criteria and individually in relation to each of a plurality of application flows associated with said client application, a flow-level performance measure indicative of the performance of said application flow; and
    collating respective flow-level performance measures and deriving, according to a predetermined function of said respective flow-level performance measures, an application-level service-quality measure indicative of an application-level quality of service in respect of the client application.

20. A data network resource allocation system according to claim 19 wherein said network resources comprise available amounts of bandwidth.

21. A data network resource allocation system according to claim 19 arranged to allocate network resources between a plurality of network applications in an internet protocol virtual private network.

22. A method for allocating network resources between a plurality of network applications, each of said network applications having associated therewith one or more application flows, each application flow being an exchange of data packets containing data of relevance to said network application; said method comprising:
  determining, in respect of each of said network applications, an application-level importance measure;
  determining, in respect of each of said network applications, an application-level quality of service measure; and
  allocating network resources between said network applications in dependence on said application-level importance measures and said application-level service-quality measures;
  wherein said determining the application-level quality of service measure includes a method for deriving a measure indicative of an application-level quality of service in relation to a client application operating in a data network having a plurality of nodes whereby, in use, application data of relevance to said client application is transmitted in packets from node to node over the network by a unit of a plurality of application flows associated with said client application, each application flow being an exchange of data between the client application and one or more of a plurality of serving applications s via one or more of a plurality of network paths; the method for deriving comprising:
    monitoring one or more characteristics of transmitted data packets containing application data of relevance to said client application at one or more of said nodes, and identifying an application flow associated with each of the monitored data packets;
    determining from said monitored characteristics, according to one or more predetermined criteria and individually in relation to each of a plurality of application flows associated with said client application, a flow-level performance measure indicative of the performance of said application flow; and collating respective flow-level performance measures and deriving, according to a predetermined function of said respective flow-level performance measures, an application-level service-quality measure indicative of an application-level quality of service in respect of the client application.

23. A data network monitoring system for a data network having a plurality of nodes, whereby, in use, application data of relevance to a client application is transmitted in packets from node to node over the network by a plurality of application flows associated with said client application, each application flow being an exchange of data between the client application and one or more of a plurality of serving applications via one or more of a plurality of network paths; the monitoring system comprising:

probes arranged to monitor one or more characteristics of transmitted data packets containing application data of relevance to said client application at one or more of said nodes, and identify an application flow associated with each of the monitored data packets;

a processing system, comprising a computer processor, configured at least to perform:

a flow-level performance measurement arranged to determine from said monitored characteristics, according to one or more predetermined criteria and individually in relation to each of a plurality of application flows associated with said client application, a flow-level performance measure indicative of the performance of said application flow; and a collation configured to collate respective flow-level performance measures and to derive, according to a predetermined function of said flow-level performance measures, an application-level service-quality measure indicative of an application-level quality of service in respect of the client application;

wherein said application-level service-quality measure is derived according to a function such that in the event that a predetermined one of said flow-level performance measures is indicative of flow performance below a predetermined threshold, the application-level service-quality measure is set such as to be indicative of an application-level quality of service below a predetermined level irrespective of one or more others of said flow-level performance measures.

\* \* \* \* \*

UNITED STATES PATENT AND TRADEMARK OFFICE
CERTIFICATE OF CORRECTION

PATENT NO.        : 8,503,315 B2                                              Page 1 of 1
APPLICATION NO.   : 12/594103
DATED             : August 6, 2013
INVENTOR(S)       : John P Wittgreffe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 675 days.

Signed and Sealed this

Fifteenth Day of September, 2015

Michelle K. Lee
*Director of the United States Patent and Trademark Office*